US006338109B1

(12) United States Patent
Snyder et al.

(10) Patent No.: US 6,338,109 B1
(45) Date of Patent: *Jan. 8, 2002

(54) MICROCONTROLLER DEVELOPMENT SYSTEM AND APPLICATIONS THEREOF FOR DEVELOPMENT OF A UNIVERSAL SERIAL BUS MICROCONTROLLER

(75) Inventors: Warren S. Snyder, Snohomish; Frederick D. Jaccard, Woodinville, both of WA (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/711,419

(22) Filed: Aug. 30, 1996

(51) Int. Cl.[7] .............................................. G06F 13/00
(52) U.S. Cl. ........................ 710/129; 710/100; 710/126; 710/127; 711/103; 714/29; 395/500
(58) Field of Search .................... 395/183.05, 200.53, 395/500, 306, 309, 307, 280; 703/23, 28; 711/103; 714/29; 709/223; 710/129, 127, 100, 126

(56) References Cited

U.S. PATENT DOCUMENTS

| 3,833,888 A | | 9/1974 | Stafford et al. |
| 4,038,533 A | | 7/1977 | Dummermuth |
| 4,042,972 A | | 8/1977 | Gruner et al. |
| 4,433,378 A | * | 2/1984 | Leger ........................ 395/280 |
| 4,466,055 A | | 8/1984 | Kinoshita et al. |
| 4,511,968 A | | 4/1985 | Fencsik et al. |
| 5,047,926 A | * | 9/1991 | Kuo et al. ............. 395/183.05 |
| 5,241,631 A | * | 8/1993 | Smith et al. ................ 395/306 |
| 5,313,618 A | * | 5/1994 | Pawloski ..................... 703/28 |
| 5,319,754 A | * | 6/1994 | Meinecke et al. .......... 710/130 |
| 5,329,471 A | * | 7/1994 | Swoboda et al. ............. 703/23 |
| 5,426,421 A | * | 6/1995 | Gray ..................... 395/200.53 |

(List continued on next page.)

FOREIGN PATENT DOCUMENTS

WO        WO 97/36230        10/1997

OTHER PUBLICATIONS

Universal Serial Bus Specification, Revision 1.0, pp. 1–268, Jan. 15, 1996.

Universal Host Controller Interface (UHCI) Design Guide, Revision 1.1, Intel, pp. 1–41, Mar. 1996.

Warren Snyder, "Dual ROM Microprogrammable Microprocessor and Universal Serial Bus Microcontroller Development System", U.S. Serial No. 08/705,807, Filed Aug. 30, 1996. (Now U.S. Patent No. 5,859,993—Issued Jan. 12, 1999).

Primary Examiner—Ayaz R. Sheikh
Assistant Examiner—Frantz Blanchard Jean
(74) Attorney, Agent, or Firm—Christopher P. Maiorana, P.C.

(57) ABSTRACT

A microcontroller including a system bus; a microprocessor coupled to the system bus and configured to transfer data and control signals over the system bus; a memory device coupled to the microprocessor and mapped to the system bus and configured to store microprogram instructions for execution by the microprocessor; a controller coupled to the system bus and configured to transfer data and control signals to the microprocessor over the system bus; a host interface coupled to the system bus and configured to interface to a host computer and receive the data and the control signals over the system bus from the microprocessor; and an I/O interface coupled to the system bus and configured to interface to at least one I/O device and receive the data and the control signals over the system bus from the microprocessor.

23 Claims, 2 Drawing Sheets

U.S. PATENT DOCUMENTS

| | | | | |
|---|---|---|---|---|
| 5,495,593 A | * | 2/1996 | Elmer et al. | 711/103 |
| 5,546,562 A | * | 8/1996 | Patel | 395/500 |
| 5,664,123 A | * | 9/1997 | Lee et al. | 395/309 |
| 5,675,813 A | | 10/1997 | Holmdahl | |
| 5,684,721 A | * | 11/1997 | Swoboda et al. | 364/578 |
| 5,689,684 A | * | 11/1997 | Mulchandani et al. | 703/23 |
| 5,691,994 A | * | 11/1997 | Acosta et al. | 371/40.1 |
| 5,758,107 A | * | 5/1998 | Robles et al. | 395/307 |
| 5,805,792 A | * | 9/1998 | Swoboda et al. | 703/23 |
| 5,941,979 A | * | 8/1999 | Lentz | 712/33 |

* cited by examiner

MICROCONTROLLER DEVELOPMENT SYSTEM AND APPLICATIONS THEREOF FOR DEVELOPMENT OF A UNIVERSAL SERIAL BUS MICROCONTROLLER

BACKGROUND OF THE INVENTION

1. Field of the Invention

This invention relates to microprocessor development systems, and more particularly to a Universal Serial Bus ("USB") microcontroller development system configured to aid in the design, debug, and testing of USB compliant devices and firmware.

2. Discussion of Background

USB is a peripheral bus standard that allows computer peripherals to be attached to a personal computer without the need for specialized cards or other vendor specific hardware attachments. The USB standard specifies a common configuration for the connection of well known peripherals such as CD-ROM, tape and floppy disk drives, scanners, printers, keyboards, joysticks, mice, telephones, modems, etc. In addition to well known peripheral devices, the USB standard has flexibility to accommodate less known and newly developed technologies. Information about the USB standard, including the specification for building USB compliant devices, is currently available free of charge over the Internet.

Developers wishing to implement USB devices must build that device to the USB standard. Prior to fabricating IC's for USB standard devices, a developer will spend a significant amount of resources in testing and refinement of prototypes. An efficient method for testing USB compliant devices is needed to reduce the costs associated with prototype development and testing of those devices.

The design and manufacture of electronic devices such as counters, state machines, specialized registers, and microprocessors is currently aided by technologies that allow engineers to specify design characteristics of a circuit, such as storage device size, register types, connections and associated logic, in a Hardware Description Language ("HDL"). This source code or HDL is then compiled, allowing the electronic device to be simulated and debugged while implementing the specified circuit characteristics. Once the operation of device is verified, the compiled source code can be mapped to a specific architecture such as Application Specific Integrated Circuits ("ASICs") or Field Programmable Gate Arrays ("FPGAs"). This allows the system designer to produce a device with design flexibility and portability into various architecture families.

As an example, a 3-bit shift register can be implemented in a HDL such as Register Transfer Language ("RTL") with the following RTL statements:

```
ENTITY shifter3 IS port (
    clk :   IN BIT;
    x   :   IN BIT;
    q0  :   OUT BIT;
    q1  :   OUT BIT;
    q2  :   OUT BIT;
END shifter3;
ARCHITECTURE struct OF shifter3 IS
    SIGNAL q0_temp, q1_temp, q2_temp : BIT;
    BEGIN
        d1  : DFF PORT MAP (x,clk,q0_temp);
        d2  : DFF PORT MAP (q0_temp,clk,q1_temp);
        d3  : DFF PORT MAP (q1_temp,clk,q2_temp);
```

-continued

```
        q0  <= q0_temp;
        q1  <= q1_temp;
        q2  <= q2_temp;
END struct;
``` which defines the inputs and outputs of the shifter and then maps those bits to a series of D Flip-Flops. After compiling the source code and debugging the circuit, a netlist can be generated for a specific family of FPGA or ASIC devices to produce the circuit with the desired functionality.

SUMMARY OF THE INVENTION

Accordingly, one object of the present invention is to provide a flexible USB microcontroller development system that allows for testing of USB compliant devices. The microcontroller includes a microprocessor with instruction RAM, a controller with a computer interface (e.g., RS-232) to a personal computer or other external computing device, data RAM, USB logic and registers for interfacing to a USB host computer, and I/O logic and registers for interfacing to an I/O device. The USB microcontroller development system includes the microcontroller, an external computer, a USB host computer, and an I/O device. The USB microcontroller development system allows both the microprocessor or an attached external computer to control the microcontroller. This is accomplished by mapping the USB microcontroller system state which includes the contents of the data RAM, the microprocessors system state registers including system state registers corresponding to the contents of the instruction RAM, the USB logic registers, and the I/O logic registers to a system bus. The controller or microprocessor places address, data, and control signals on the system bus which are decoded by various logic to allow reading or writing of the system state. The controller reads or writes the instruction RAM by reading or writing a program counter and an instruction register, included as part of the microprocessor's system state registers, via the system bus. Accordingly, the external computer connected to the controller via the RS-232 bus can read or write the USB microcontroller system state to aid in the design, debug, and testing of USB compliant devices and firmware.

It is also an object of the present invention to provide a development access device on the external computer for providing a user a graphical interface for controlling the USB microcontroller. The development access device displaying menus, buttons, text boxes etc. corresponding to the microprocessor's system state registers, the contents of the instruction RAM, the USB logic registers, and the I/O logic registers. The user, after selecting the appropriate menu, button, or filling in the appropriate text box, can read or write the corresponding microprocessor's system state registers, the contents of the instruction RAM, the USB logic registers, and the I/O logic registers via the external computer and computer interface to control the USB microcontroller.

It is yet another object of the present invention to provide a method for implementing the above USB microcontroller development system utilizing a Hardware Description Language. By utilizing a Hardware Description Language, the design engineers are free to concentrate on the design of important features of the system and it's functionality rather than a gate level implementation of the system. After determining top level characteristics and functional blocks of the system, an HDL program describing those characteristics and functional blocks is developed and debugged. In the present invention, HDL implemented processes are used in designing various functional blocks of the USB microcontroller development system. The USB microcontroller development system designed using HDL is then mapped to FPGAs and packaged onto a single printed circuit board along with minimal additional logic such as EEPROMs and RAM.

The above and other objects are achieved according to the present invention by providing a new and improved microcontroller including a system bus; a microprocessor coupled to the system bus and configured to transfer data and control signals over the system bus; a memory device coupled to the microprocessor and mapped to the system bus and configured to store microprogram instructions for execution by the microprocessor; a controller coupled to the system bus and configured to transfer data and control signals to the microprocessor over the system bus; a host interface coupled to the system bus and configured to interface to a host computer and receive the data and the control signals over the system bus from the microprocessor; and an I/O interface coupled to the system bus and configured to interface to at least one I/O device and receive the data and the control signals over the system bus from the microprocessor.

According to a second aspect of the present invention, there is provided a method of fabricating a microcontroller including steps of determining functional microprocessor requirements that will at least provide execution control of the microprocessor; determining functional control circuit requirements that will at least provide control of the microprocessor; determining functional host interface requirements that will at least provide an interface to a host computer; determining functional I/O interface requirements that will at least provide an interface to at least one I/O device; defining the functional requirements of the microprocessor, the control circuit, the host interface and the I/O interface in an Hardware Description Language (HDL); compiling the HDL language to derive a circuit representation of the microcontroller; and mapping the circuit representation onto one or more devices.

According to a third aspect of the present invention, there is provided a microcontroller development system including a system bus; a microprocessor coupled to the system bus and configured to transfer data and control signals over the system bus; a memory device coupled to the microprocessor and mapped to the system bus and configured to store microprogram instructions for execution by the microprocessor; an external computing device; a controller coupled to the system bus and configured to transfer data and control signals to the microprocessor over the system bus including a computer interface coupled to the system bus and configured to transfer commands from the external computing device to the controller, the commands used by the controller to generate the data and the control signals for controlling the microprocessor; a host interface coupled to the system bus and configured to interface to the external computing device and receive the data and the control signals over the system bus from the microprocessor; at least one I/O device; and an I/O interface coupled to the system bus and configured to interface to the at least one I/O device and receive the data and the control signals over the system bus from the microprocessor.

According to a fourth aspect of the present invention, there is provided a method of development of a microcontroller in a microcontroller development system, including steps of loading a set of microprocessor instructions into a memory device coupled to a microprocessor of the microcontroller, the instructions loaded from an external computer coupled to a computer interface of the microcontroller, the external computer directed to load the microprocessor instructions by a developer access device running on the external computer; retrieving the set of microprocessor instructions from the memory device for execution by the microprocessor; and controlling a starting, stopping, and single step execution of the microprocessor instructions by the microprocessor by the developer access device reading and writing at least one register of system state registers of the microprocessor.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 1:
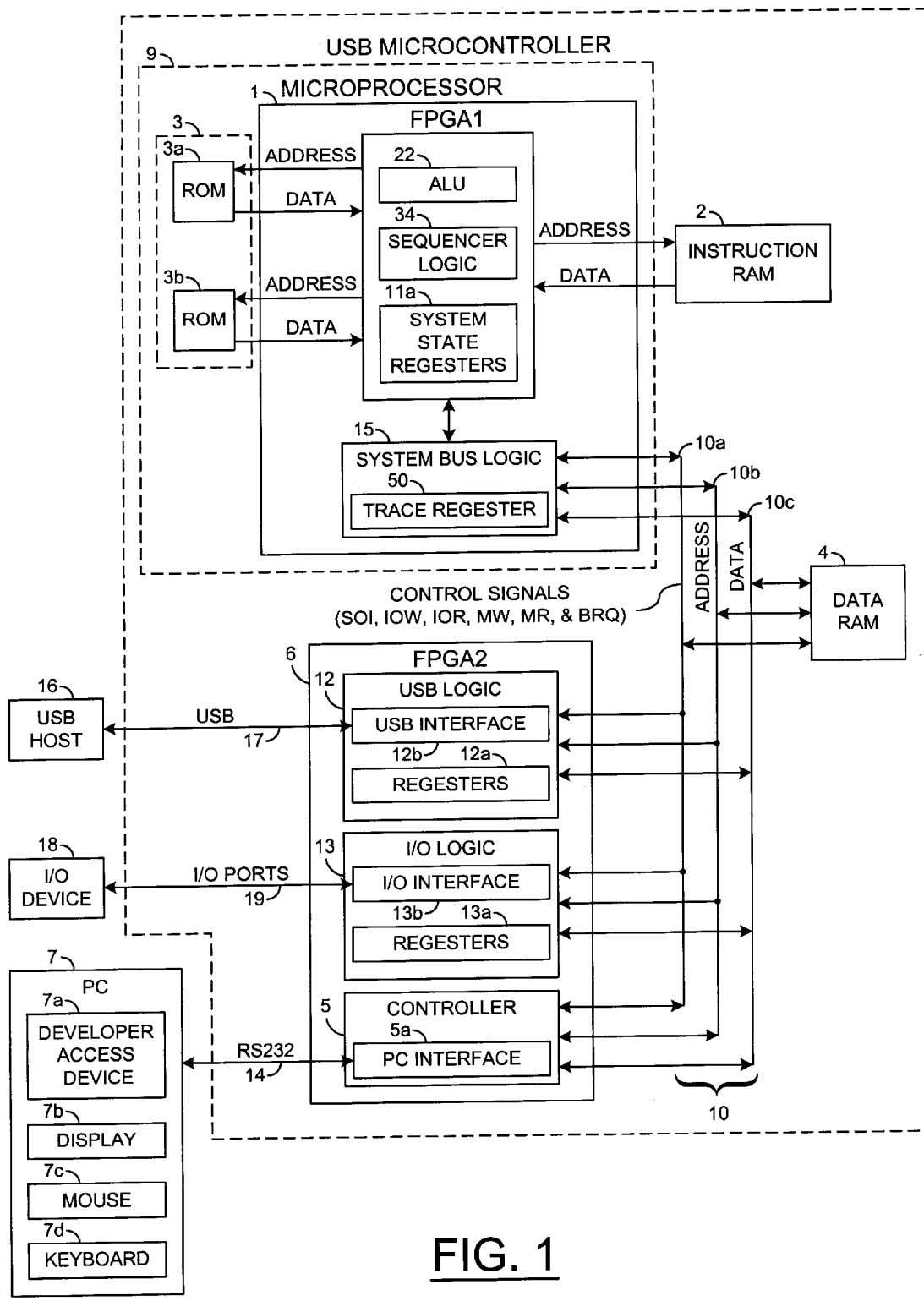
FIG. 1 is a block diagram implementing the USB microcontroller development system according to the present invention.

Referring now to the drawings, wherein like reference numerals designate identical or corresponding parts throughout the several views, and more particularly to FIG. 1 thereof, the present invention includes a USB microcontroller development system 100, which allows 100% testing of USB firmware before the fabrication of final ICs. The USB microcontroller development system 100 is designed using FPGAs, EEPROMs and RAMs, but may be implemented in other electronic configurations including ASICs and/or microprocessor systems having a computing device with appropriately mapped system states and I/O interfaces, as described herein.

The operation of the USB microcontroller development system will be discussed with reference to FIGS. 1–3.

In FIG. 1, FPGA1 1 and EEPROMs 3 implement a microprocessor 9. Within the microprocessor 9 is provided circuit block 11 including ALU 22, sequencer logic 34, and system state registers 11a. System state registers 11a are mapped to a system bus 10 through system bus logic 15 which includes a trace register 50. Microprocessor 9 is connected to instruction RAM 2 which is used to store USB firmware under development.

FPGA2 6 includes USB logic 12 which provide an interface to a USB host computer 16 via USB bus 17 and includes registers 12a; I/O logic 13 which provides an interface to an I/O device 18 via I/O ports 19 and includes registers 13a; and controller 5 which provides a PC interface 5a to the PC 7 (or other external computing device) via RS-232 bus 14. The USB logic 12, the I/O logic 13 and the controller 5 are coupled to the system bus logic 15 of microprocessor 9 via the system bus 10. In addition, system bus logic 15 includes trace register 50 which is mapped to the system bus and can be accessed by either the controller 5 or the microprocessor 9 to control the execution of firmware running in instruction RAM 2.

As previously discussed, the purpose of the USB microcontroller development system is to aid engineers in the design, debug and development of USB compliant devices and USB firmware. This is accomplished by providing a flexible USB microcontroller development system that allows data gathering and stimulation of the USB microcontroller system state by providing the system state as addressed I/O, provides a computer interface to the USB microcontroller and allows a user to load and control execution of USB firmware, an d provides an interface to a USB host computer and USB device under development.

The data gathering and stimulation of the USB microcontroller system state will now be described.

The USB microcontroller system state is determined by providing access to the following registers: System state registers 11a of microprocessor 9 including (not shown): a program counter which holds the address of the instruction RAM 2, an instruction register which holds the data corresponding to the program counter, stack pointers which are addresses into data RAM 4, and temporary registers which are used during execution of instructions from instruction RAM 2 by microprocessor 9. In addition the USB microcontroller system state includes data memory contents in data RAM 4, USB logic registers 12a, I/O logic registers 13a, and trace register 50 of system bus logic 15.

The above registers are I/O mapped to the system bus 10, so that when an address is placed on the system bus the system bus logic 15, USB logic 12 and I/O logic 13 decode this address to determine which logic block and which register within the logic block is being addressed.

In addition, system bus 10 includes several control signals 10a that are provided by microprocessor 9 or controller 5. From the microprocessor 9:

SOI (start of instruction): tells the USB logic 12, I/O logic 13, and controller 5 that a new instruction is about to execute in instruction RAM 2;

IOW (I/O write): tells the USB logic 12, I/O logic 13, and controller 5 that the microprocessor 9 wishes to write to system state registers 11a, USB logic registers 12a, I/O logic registers 13a, or trace register 50;

IOR (I/O read): tells the USB logic 12, I/O logic 13, and controller 5 that the microprocessor 9 wishes to read system state registers 11a, USB logic registers 12a, I/O logic registers 13a, or trace register 50;

MW (memory write): tells the USB logic 12, I/O logic 13, and controller 5 that the microprocessor 9 wishes to write data to data RAM 4;

MR (memory read): tells the USB logic 12, I/O logic 13, and controller 5 that the microprocessor 9 wishes to read data from data RAM 4; and From the Controller 5:

Control signals IOW, IOR, MW and MR of control signals 10a are the same as from the microprocessor 9, except from the point of view of the controller 5, they share the same physical wire/signal paths but the scope is determined by a master bus request ("BRQ") control signal of control signals 10a. BRQ allows the controller 5 to preempt the microprocessor 9 and have the controller 5 control signals replace those of the microprocessor 9. The value/states of the controller 5 control signals 10a are generated from a finite state machine (not shown) in controller 5 that also communicates with the PC 7 using an RS-232 serial data protocol. In this way controller 5 can take over control of the system from microprocessor 9 and read and write the contents of the system state.

The computer interface and execution control and loading of USB firmware will now be described.

In FIG. 1, PC 7 includes developer access device 7a which is a graphical user interface ("GUI") or other software running on PC 7 for displaying menus, buttons, text boxes etc. (not shown) on display 7b corresponding system state registers 11a, trace register 50, USB logic registers 12a, and I/O registers 13a and for commanding PC 7 to transfer appropriate commands over the RS-232 bus 14 to PC interface 5a of controller 5. Thus, the user, after selecting the appropriate menu, button, or filling in the appropriate text box with mouse 7c and keyboard 7d, can read or write the corresponding system state registers 11a, trace register 50, USB logic registers 12a, and I/O registers 13a via PC 7, RS-232 bus 14 and PC interface 5a to control the USB microcontroller 8.

On command from developer access device 7a, as previously described, PC 7 sends a series of three 8-bit data bytes as serial data to PC interface Sa of controller 5 in a command structure over RS–232 bus 14. The PC interface 5a includes a UART function for providing the RS-232 function. The first byte sent by PC 7 is either an I/O (system state registers 11a, USB logic registers 12a, I/O logic registers 13a, or trace register 50) or data RAM 4 address; the second byte is a command; and the third byte is a data value that together with the address byte and the command byte identifies and supports data read and write operations to either an I/O or data RAM 4 address location. The I/O and data RAM 4 command structure is outlined in Table A.

TABLE A

Command Structure

| Command Name | Address Byte | Command Byte (hex) | Data Byte x = don't care | Function |
|---|---|---|---|---|
| WRITE DATA BYTE | Data RAM 4 Address | 00 | DATA | Write the Data Byte to the location identified by |
|  | *I/O Address | 02 | DATA | the Address Byte. |
| READ DATA BYTE | Data RAM 4 Address | 01 | XX | Read the data byte at the location identified by the |
|  | *I/O Address | 03 | XX | address byte an transmit the byte read to PC 7. |

*I/O includes system state registers 11a, USB logic registers 12a, I/O logic registers 13a, and trace register 50.

Trace register 50 of system bus logic 15 has two status bits (see FIG. 2) that can be read or written to by using the previously mentioned command structure, control of the USB microcontroller development system 100 can be facilitated by either PC 7 or microprocessor 9 which have access to data RAM 4, system state registers 11a, and trace register 50 via the command structure of Table A.

Figure 2:
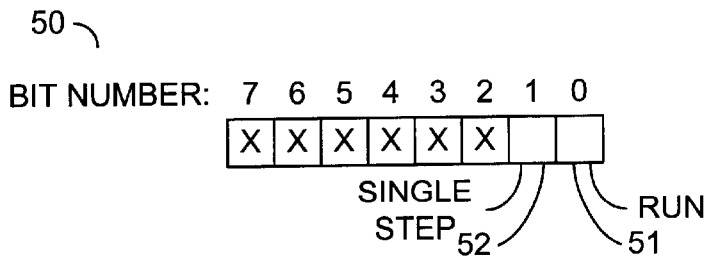
FIG. 2. is a bit-diagram of a trace register used on the USB microcontroller of FIG. 1.

FIG. 2. is a bit-diagram of a trace register 50 provided in system bus logic 15 to implement the above function. The contents of the trace register 50 can be modified by the microprocessor 9 or the PC 7 via the command structure of Table A. RUN 51 (bit 0) of trace register 50, if set (bit 0=1), causes the microprocessor 9 to execute instructions from instruction RAM 2, and if reset or cleared (bit 0=0), causes the microprocessor 9 to stop executing instructions from instruction RAM 2. SINGLE STEP 52 (bit 1) of trace register 50, along with the RUN 51 control how many instructions from instruction RAM 2 microprocessor 9 executes.

Figure 3:
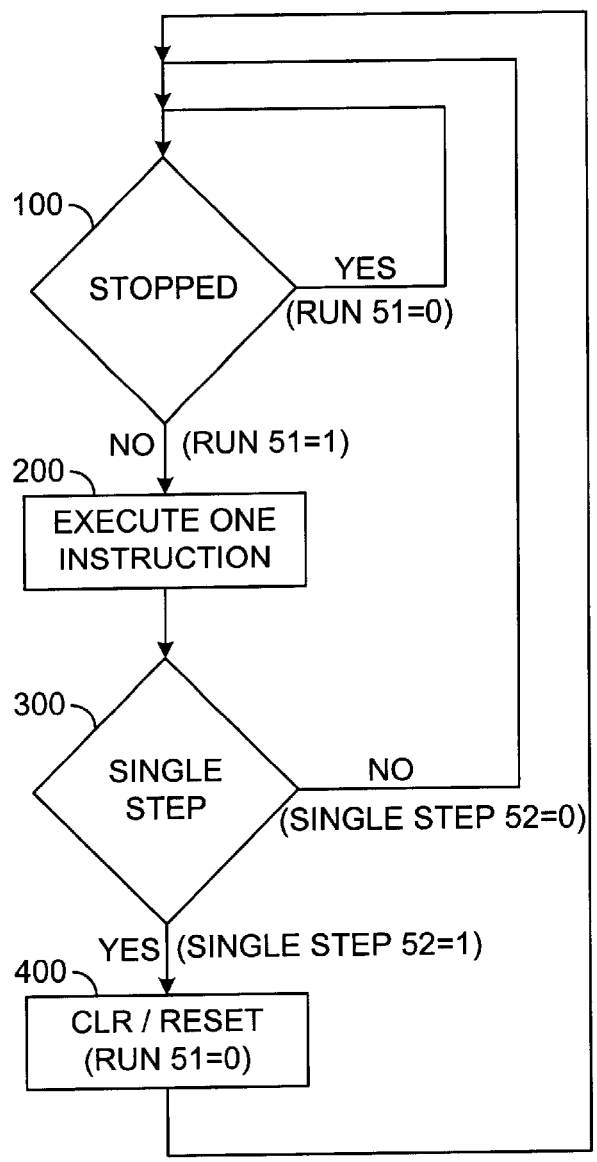
FIG. 3. is a logic flow diagram showing the run/single step operations of the USB microcontroller development system of FIG. 1.

FIG. 3. is a logic flow diagram showing the RUN/SINGLE STEP operations outlined above.

At step 100 the microprocessor 9 is stopped (RUN 51=0). As long as RUN 51 is set to zero, by either the microprocessor 9 or the controller 5, the microprocessor will not execute instructions in instruction RAM 2. However, if RUN 51 is set to one, by the controller 5, the logic flow goes to step 200.

At step 200 one instruction is executed by microprocessor 9 from instruction RAM 2 and the logic flows to step 300.

At step 300 the contents of the SINGLE STEP 52 is checked. If SINGLE STEP 52 is set to zero (SINGLE STEP 52=0), by either the microprocessor 9 or the controller 5, single step mode is not being selected and the logic flows back to step 100 where steps 100–300 are executed until either the microprocessor 9 or the controller 5 sets RUN 51 to zero causing the microprocessor 9 to stop executing instructions from instruction RAM 2. If SINGLE STEP 52 is set to one (SINGLE STEP 52=1), by either the microprocessor 9 or the controller 5, single step mode is being selected and the logic flows to step 400.

At step 400 RUN 51 is set to zero, the logic flows to step 100, and the microprocessor 9 is stopped at step 100 since RUN 51 was set to zero at step 400.

In this way, during single step mode only one instruction is executed at steps 100–400, the microprocessor 9 is stopped at step 100 since RUN 51 is set to zero at step 400, and the PC 7 must issue an I/O write command to set RUN 51 to one at step 100 in order for microprocessor 9 to execute the next instruction from instruction RAM 2. If single step mode is not set, then microprocessor 9 continuously executes instructions from instruction RAM 2 until either the microprocessor 9 itself or the PC 7 issues a write data byte command to clear RUN 51 to zero. At any time the PC 7 can modify/read the USB microcontroller system state, as described previously, to assist in debugging firmware stored in instruction RAM 2.

In addition, since PC 7 can write the system state registers 11a of microprocessor 9, as described previously, which include the program counter (not shown) which is the address of the instruction RAM 2, an instruction register (not shown) which holds the data corresponding to the program counter, PC 7 can be used to load firmware into instruction RAM 2 for execution by microprocessor 9.

The program counter holds the address of instruction RAM 2 and instruction register holds the data corresponding to the program counter. Thus, by PC 7 writing to the program counter and the instruction register and the sequencer logic 34 issuing a write command to instruction RAM 2, the entire contents of instruction RAM 2 may be written to by PC 7. Similarly, by writing an address to the program counter and the sequencer logic 34 issuing a read command to instruction RAM 2, the entire contents of instruction RAM 2 may be read.

The interface to a USB host computer and USB device under development will now be described.

A USB host computer 16 is connected to USB interface 12b of USB logic 12 via USB 17. USB interface 12b complies with the USB standard. The USB logic 12 decodes addresses on the system bus 10, allowing microprocessor 9 or controller 5 to read or write contents of the USB logic registers 12a via the command structure, as previously described.

Sensors, potentiometer, motors, LEDs, memories, data collecting or other input output devices of an I/O device 18 are connected to I/O interface 13b via I/O ports 19. The I/O logic 13 decodes addresses on the system bus 10, allowing microprocessor 9 or controller 5 to read or write contents of the I/O logic registers 13a via the command structure, as previously described.

As an example, the USB microcontroller development system 100 could be used to debug firmware for a USB mouse or joystick, etc. In this case, the mouse or joystick sensors, potentiometer, etc. would be attached to I/O interface 13b via I/O ports 19, and the USB host computer 16 would be attached to USB interface 12b via USB 17. The firmware could be loaded from PC 7 to instruction RAM 2 by writing to the system state registers 11a and then debugged using the trace register 50 function and the ability to read/modify the microcontroller system state, as previously described. In this way, the USB mouse or joystick function etc. could implemented to run on USB host computer 16 via the USB microcontroller development system 100.

The present invention may be implemented via a Hardware Description Language, as previously described.

As an example, the writing operation of the system state registers 11a can be implemented in HDL with statements such as:

```
always @ (posedge REGW)
    begin
        case (LA)
            'rA:        a = DI;
            'rT1:       t1 = DI;
            'rT2:       t2 = DI;
            'rDSP:      dsp = DI;
            'rPSP:      psp = DI;
            'rPCL:      pcl = DI;
        endcase
    end
``` and mapping of the system state registers 11a can be implemented in HDL with statements such as:

```
always @ (LA or a or t1 or t2 or ID or IR or dsp or psp or pcl or pch)
    begin
        #5;
        case (LA)
            'rA:        LD = a;
            'rT1:       LD = t1;
            'rT2:       LD = t2;
            'rDSP:      LD = dsp;
            'rPSP:      LD = psp;
            'rPCL:      LD = pcl;
            'rPCH:      LD = pch;
            'rID:       LD = ID;
        endcase
    end
``` and HDL statements such as:

```
assign #1 regSelect = (DA[7:3] == 5'b1110);
assign #1 idSelect  = (DA[7:3] == 5'b1111);
``` implement the address decode for the system state registers 11a and data RAM 4.

In the present invention, HDL implemented processes are used in designing various components of the USB microcontroller 8 to achieve the various objects of the invention. The various components of the USB microcontroller 8, when appropriately programmed in HDL, are mapped to FPGAs and packaged onto a single printed circuit board along with minimal additional logic such as EEPROMs and RAM.

Although in the preferred embodiment the USB microcontroller 8 includes several FPGAs, RAM and EEPROMs packaged onto a circuit board, this invention may be implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Although the preferred embodiment of the USB microcontroller development system 100 is described in terms of a USB development system, the present invention could be adapted for other device standards such as Newbus, PCI, VESA, etc. by simply modifying the USB logic 12 and I/O logic 13 functional blocks, as will be apparent to those skilled in the art.

Although the preferred embodiment of the USB microcontroller development system 100 is described in terms of providing a PC interface via an RS-232 bus, the present invention could be adapted to interface to various types of personal computers, workstations, etc. by simply modifying controller 5 functional block to include the appropriate interface, as will be apparent to those skilled in the computer art.

Although the preferred embodiment of the USB microcontroller development system 100 is described in terms of providing an external computer PC 7 and a USB host computer 16, the external computer PC 7 could also function as the USB host computer 16, as will be apparent to those skilled in the computer art.

Although the preferred embodiment of the USB microcontroller 8 is described in terms of providing a PC interface 5a and an instruction RAM 2, in a delivered system the USB microcontroller 8 would not include the PC interface 5a and the instruction RAM 2 would be replaced by a Read Only Memory ("ROM") device, as will be apparent to those skilled in the computer art.

The present invention includes a computer program product (developer access device 7a of PC 7) which may be on a storage medium including instructions which can be used to program PC 7 to perform a process of the invention. The storage medium can include, but is not limited to, any type of disk including floppy disks, optical discs, CD-ROMs, and magneto-optical disks, ROMs, RAMs, EPROMS, EEPROMs, magnetic or optical cards, or any type of media suitable for storing electronic instructions.

Obviously, numerous modifications and variations of each embodiment of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A microcontroller comprising:
    a system bus;
    a microprocessor coupled to said system bus and configured to transfer data and control signals over said system bus;
    a memory device coupled to said microprocessor and mapped to said system bus and configured to store microprogram instructions for execution by said microprocessor;
    at least a first register mapped to said system bus;
    a trace register mapped to said system bus;
    a controller coupled to said system bus and configured to transfer data and control signals to said microprocessor over said system bus, wherein said controller further comprises a computer interface coupled to said system bus and configured to provide an external computer access to said at least first register, said memory device, and said trace register;
    a host interface coupled to said system bus and configured to interface to a host computer and receive said data and said control signals over said system bus from said microprocessor; and
    an I/O interface coupled to said system bus and configured to interface to at least one I/O device and receive said data and said control signals over said system bus from said microprocessor.

2. The microcontroller according to claim 1, wherein said computer interface is configured to transfer commands from said external computer to said controller, said commands used by said controller to generate said data and said control signals for controlling said microprocessor.

3. The microcontroller according to claim 1, wherein said controller is configured to control reading and writing contents of said first register, said trace register and said memory device mapped to said system bus.

4. The microcontroller, according to claim 3, wherein:
    said trace register comprises control bits;
    said at least first register comprises M registers mapped to said system bus and configured to store microprocessor state data used to control said microprocessor;
    said microprocessor is configured to operate in a plurality of execution modes, dependent on said control bits stored in said trace register; and
    said control bits are configured to both identify and control said microprocessor to operate in at least one execution mode of said plurality of execution modes.

5. The microcontroller according to claim 4, wherein said controller and said microprocessor are configured to read from or write to said trace register for identifying and controlling said microprocessor to operate in said at least one execution mode of said plurality of execution modes.

6. The microcontroller according to claim 5, wherein said controller is configured to provide said external computer access for identifying and controlling said microprocessor to operate in said at least one execution mode as a function of commands transferred from said external computer to said controller.

7. The microcontroller according to claim 6, wherein said host interface conforms to specifications for a Universal Serial Bus (USB).

8. A method of fabricating a microcontroller, comprising steps of:

determining functional control circuit requirements that will at least provide control of a microprocessor, wherein said microprocessor is coupled to a system bus;

determining functional memory device requirements that will at least provide a memory device coupled to said microprocessor and mapped to said system bus and configured to store microprogram instructions for execution by said microprocessor;

determining first functional register requirements that will provide at least a first register mapped to said system bus;

determining second functional register requirements that will at least provide a trace register mapped to said system bus;

determining functional host interface requirements that will at least provide a host interface to a host computer, wherein said host interface is coupled to said system bus;

determining functional I/O interface requirements that will at least provide an I/O interface to at least one I/O device, wherein said I/O interface is coupled to said system bus;

determining functional controller requirements that will at least provide a controller coupled to said system bus and configured to transfer data and control signals to said microprocessor over said system bus, wherein said controller further comprises a computer interface coupled to said system bus and configured to provide an external computer access to said at least first register, said memory device, and said trace register;

defining said functional requirements of said microprocessor, said system bus, said memory device, said at least a first register, said trace register, said control circuit, said host interface and said I/O interface; and compiling said defined functional requirements to derive a circuit representation of said microcontroller.

9. The method according to claim 8, wherein the functional control circuit requirements determining step further comprises a step of determining functional control circuit requirements to provide said computer interface.

10. The method according to claim 9, wherein the functional host interface requirements determining step further comprises a step of determining functional host interface requirements to provide an interface which conforms to specifications for a Universal Serial Bus (USB).

11. A microcontroller development system comprising:

a system bus;

a microprocessor coupled to said system bus and configured to transfer data and control signals over said system bus;

a memory device coupled to said microprocessor and mapped to said system bus and configured to store microprogram instructions for execution by said microprocessor;

at least a first register mapped to said system bus;

a trace register mapped to said system bus;

an external computing device;

a controller coupled to said system bus and configured to transfer data and control signals to said microprocessor over said system bus, comprising, a computer interface coupled to said system bus and configured to (i) transfer commands from said external computing device to said controller, said commands used by said controller to generate said data and said control signals for controlling said microprocessor and (ii) provide said external computing device access to said at least first register, said memory device, and said trace register;

a host interface coupled to said system bus and configured to interface to said external computing device and receive said data and said control signals over said system bus from said microprocessor;

at least one I/O device; and an I/O interface coupled to said system bus and configured to interface to said at least one I/O device and receive said data and said control signals over said system bus from said microprocessor.

12. The development system according to claim 11, wherein said external computing device comprises an external computer coupled to said computer interface and a host computer coupled to said host interface.

13. The development system according to claim 11, wherein said controller is configured to control reading and writing contents of said first register, said trace register and said memory device mapped to said system bus.

14. The development system, according to claim 13, wherein:

said trace register comprises control bits;

said at least first register comprises M registers mapped to said system bus and configured to store microprocessor state data used to control said microprocessor;

said microprocessor is configured to operate in a plurality of execution modes, dependent on said control bits stored in said trace register; and said control bits are configured to both identify and control said microprocessor to operate in at least one execution mode of said plurality of execution modes.

15. The development system according to claim 14, wherein said controller and said microprocessor are configured to read from and write to said trace register for identifying and controlling said microprocessor to operate in said at least one execution mode of said plurality of execution modes.

16. The development system according to claim 15, wherein said controller is configured to provide said external computer access for identifying and controlling said microprocessor to operate in said at least one execution mode as a function of said commands transferred from said external computer to said controller.

17. The development system according to claim 16, wherein said external computer further comprises:

a display device; and a developer access device running on said external computer and configured to control said microprocessor by directing said external computer to read from and write to said M registers, said memory device, and said trace register mapped to said system bus via said computer interface.

18. The development system according to claim 17, wherein said developer access device comprises a graphical user interface (GUI) configured to display menus, buttons, and text boxes on said display, said menus, buttons, and text boxes corresponding to said M registers, said memory device, and said trace register mapped to said system bus.

19. The development system according to claim 18, wherein said host interface conforms to specifications for a Universal Serial Bus (USB).

20. A method for development of a microcontroller in a microcontroller development system, comprising the steps of:

loading a set of microprocessor instructions into a memory device coupled to a microprocessor of said microcontroller, wherein said microprocessor is coupled to a system bus, at least a first register of a plurality of system state registers, a trace register and said memory device each mapped to said system bus, said set of microprocessor instructions are loaded from an external computer coupled to a computer interface of said microcontroller, wherein said computer interface is coupled to said system bus and further comprises a controller configured to transfer data and control signals to said microprocessor over said system bus, said external computer directed to load said set of microprocessor instructions by a developer access device running on said external computer;

retrieving said set of microprocessor instructions from said memory device for execution by said microprocessor; and controlling a starting, stopping, and single step execution of said set of microprocessor instructions by said developer access device reading from or writing to either said at least first register or said trace register, wherein said developer access device is coupled to said system bus through an I/O interface.

21. The method according to claim 20, further comprising the steps of:

running a graphical user interface (GUI) on said external computer for displaying menus, buttons, and test boxes on a display of said external computer, said menus, buttons, and text boxes corresponding to said plurality of system state registers, said trace register and said memory device.

22. The method according to claim 21, further comprising steps of:

selecting an appropriate menu, button, or filling in an appropriate text box with at least one of a mouse and keyboard coupled to said external computer, and reading from or writing to said plurality of system state registers, said trace register and memory device based on at least one of the selected menu, button, or filled text box.

23. The method according to claim 22, further comprising a step of employing as a host interface to said external computer an interface which conforms to specifications for a Universal Serial Bus (USB).

* * * * *